(No Model.)
E. E. WORDEN & G. A. GROVER.
HAND DEVICE FOR THE SHIPPER OR HAND ROPE OF ELEVATORS.
No. 344,557. Patented June 29, 1886.
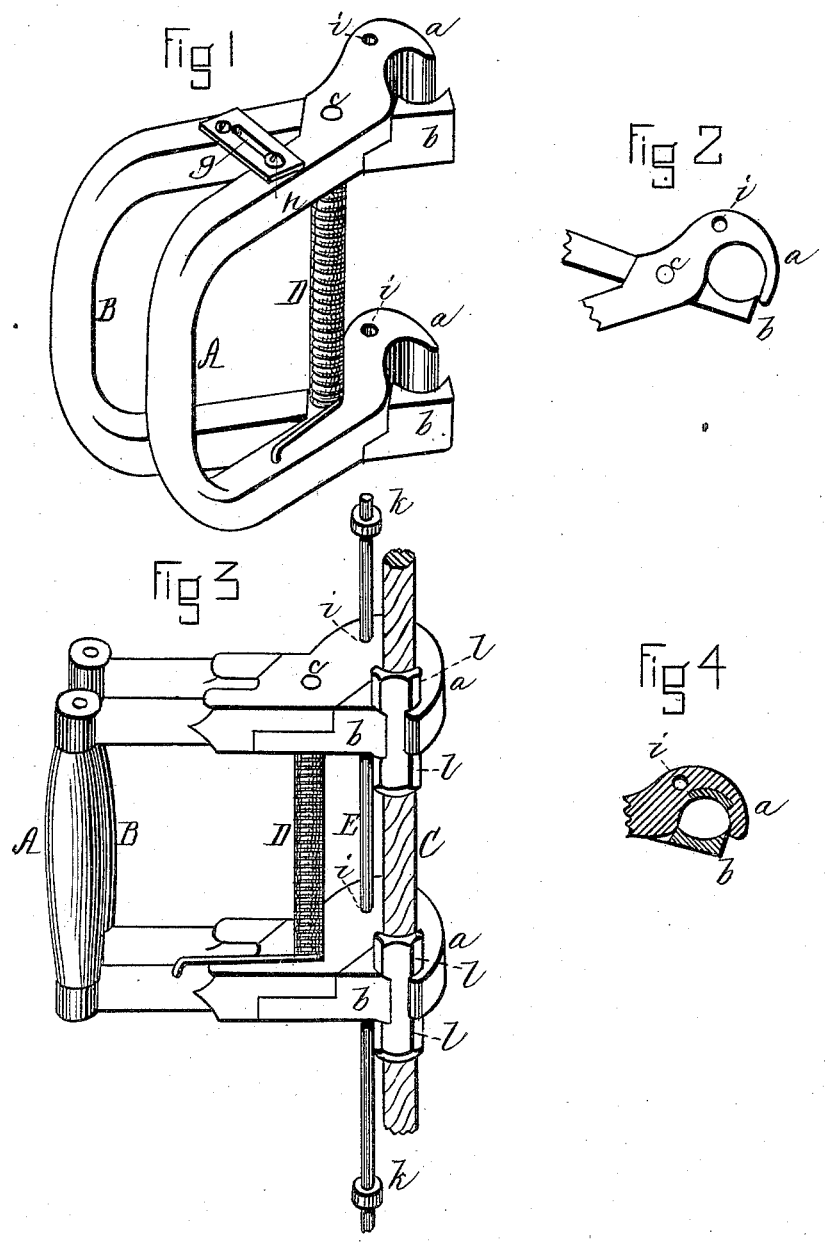
WITNESSES
INVENTORS
Edwin E. Worden
George A. Grover

UNITED STATES PATENT OFFICE.

EDWIN E. WORDEN, OF SOMERVILLE, AND GEORGE A. GROVER, OF BOSTON, MASSACHUSETTS, ASSIGNORS TO SAID GEORGE A. GROVER.

HAND DEVICE FOR THE SHIPPER OR HAND ROPE OF ELEVATORS.

SPECIFICATION forming part of Letters Patent No. 344,557, dated June 29, 1886.

Application filed November 23, 1885. Serial No. 183,787. (No model.)

*To all whom it may concern:*

Be it known that we, EDWIN E. WORDEN, of Somerville, in the county of Middlesex and State of Massachusetts, and GEORGE A. GROVER, of Boston, in the county of Suffolk and State aforesaid, have invented a Hand Implement or Device for the Shipper or Hand Rope of Elevators, of which the following is a full, clear, and exact description, reference being had to the accompanying drawings, making part of this specification, in which—

Figure 1 is a perspective view of our hand implement. Fig. 2 is a plan of the same, showing one of the jaws elongated. Fig. 3 is a side elevation of the same with a slight modification; Fig. 4, detail to be referred to.

Our invention has for its object to provide a simple, cheap, and durable device or implement to be applied to the shipper or hand rope of an elevator, to be used as a substitute and protection for the hand; and it consists in a novel combination of parts and certain details of construction, as will be hereinafter more particularly described, and specifically claimed.

In the drawings, A B represent a pair of handles, their outer ends terminating in two pairs of jaws, *a b*, pivoted together by a vertical rod or bolt, *c*, the jaws being intended to grasp and operate a shipper or hand rope, C. Around this rod *c* is wound a spiral spring, D, the opposite free ends of which are secured or attached to opposite handles, for the purpose of opening the jaws *a b*, when closed together over the shipper or hand rope by operating the handles A B, and also prevents the hand from coming in contact with the shipper or hand rope when the implement is applied thereto.

To guard against the spring opening the jaws *a b* so far as to release or allow the shipper-rope to be removed therefrom, we provide a plate, *f*, secured by screws or otherwise to one of the handles, the said plate being provided with a slot, *g*, in which works a pin or screw, *h*, projecting up from the opposite handle, thus limiting the movement of the jaws *a b*. It will thus be seen that by operating the handles A B, the jaws will be clamped upon the shipper or hand rope, and thus operate the same by pulling to stop or start the elevator.

E is a vertical rod placed in close proximity to the shipper-rope and fastened to the elevator, and upon this rod the implement can be slid up and down to steady it in its movements and keep its jaws around the shipper-rope, the rod E passing through holes or apertures *i*, provided therefor in the implement.

If desired, a suitable stop or stops, *k*, may be provided on the rod E, to limit the range of motion of the implement up or down.

One of the jaws of the implement may be elongated, as seen in Fig. 2, for the purpose of preventing the shipper-rope from slipping out of the jaws, and one of the upper and lower jaws may be provided with vertical projections *l*, Fig. 3, forming vertical elongations of the jaws for the purpose, when the jaws *a b* are closed together, of cramping or bending the shipper or hand rope, and thus afford additional security against the shipper-rope accidentally slipping through the jaws *a b*, the inner faces of these projections being curved or inclined to facilitate the cramping of the shipper or hand rope. The faces of the jaws *a b* may also be provided with a covering of wood, leather, or other suitable material to protect the shipper-rope from wear, as seen in Fig. 4.

What we claim as our invention is as follows:

1. A grasping implement for shipper or hand ropes of elevators, comprising a double pair of jaws, *a b*, connected with each other by the handles A B, the rod or bolt *c*, spring D, for opening the same, and a stop or device for limiting the extent of the opening movement, all substantially as described.

2. In a grasping implement for shipper or hand ropes of elevators, the two pairs of jaws *a b*, connected with each other by the rod *c*, and adapted to be operated by the handles A B and spring D, and having the elongated sections or projections *l*, as and for the purposes described.

3. The combination of a grasping implement for shipper or hand ropes of elevators, comprising the two pairs of spring-opened jaws $a$ $b$ and handles for closing them, with the rod $i$ and stops $k$, substantially as described.

4. A grasping implement for the shipper or hand ropes of elevators, having the jaws $a$, curved or elongated to receive and hold the shipper-rope, and the short jaws $b$, adapted to be closed or moved within the ends of the long jaws $a$, substantially as described.

Boston, November 14, 1885.

EDWIN E. WORDEN.
GEORGE A. GROVER.

Witnesses:
W. J. CAMBRIDGE,
J. Q. A. WALDRON.